United States Patent [19]

Paglericcio et al.

[11] Patent Number: 5,762,030
[45] Date of Patent: Jun. 9, 1998

[54] ANTI BARKING AND ANTI-BITING MUZZLE FOR DOGS

[76] Inventors: Fernando Paulo Paglericcio; Sandra D. Paglericcio, both of P.O. Box 272, Russell, Ontario, Canada, K4R 1E1

[21] Appl. No.: 589,951

[22] Filed: Jan. 23, 1996

[51] Int. Cl.[6] .................................................. A01K 25/00
[52] U.S. Cl. ................................................................ 119/831
[58] Field of Search .................................... 119/831, 832, 119/837; 54/12, 13, 80.3

[56] References Cited

U.S. PATENT DOCUMENTS

| D. 316,764 | 5/1991 | Edwards | 119/831 |
|---|---|---|---|
| 4,252,086 | 2/1981 | Schenck | 119/831 |
| 4,343,136 | 8/1982 | LeTixerant et al. | 54/13 |
| 5,136,984 | 8/1992 | Askinasi | 119/831 |
| 5,299,531 | 4/1994 | Dietz | 119/832 |

*Primary Examiner*—Ren Yan
*Assistant Examiner*—Leslie Grohusky
*Attorney, Agent, or Firm*—Jones, Tullar & Cooper, P.C.

[57] ABSTRACT

An anti-barking and anti-biting muzzle for dogs includes a muzzle portion formed from a pair of generally trapezoidal flaps of elastic material sewn together along the converging edges thereof, with the flaps being further divided by a seam along the longitudinal centerline thereof to create four panel members of the elastic material. An elongated strap is connected at its ends to opposed seams of the muzzle portion. The muzzle can be slid onto the snout of a dog and the strap fitted over the dog's head behind its ears. The muzzle portion has a snug fit on the snout but the elasticity of the material allows the dog to open its jaws slightly for panting. If the dog tries to open its jaws wider to bark or bite the four elastic panel members apply a force to the jaws to prevent them from opening wide. The muzzle is not uncomfortable and it acts as a training aid since the animal associates the wearing of the muzzle as a form of punishment for barking or biting. It soon learns to stop barking or biting when it event sees the muzzle. The muzzle can be quickly removed by applying an upward or lifting force on the strap behind the ears, important if the dog is relied upon to provide security for a human attendant.

4 Claims, 2 Drawing Sheets

ANTI BARKING AND ANTI-BITING MUZZLE FOR DOGS

The present invention relates to a device for keeping animals, such as dogs, quiet. In particular it relates to an elasticized muzzle device that will keep a dog from barking or biting while allowing the dog to breathe and pant as he wishes.

BACKGROUND OF THE INVENTION

There are many devices available to prevent dogs, especially large dogs, from opening their mouths. The most common is a muzzle, usually made from leather in the form of a halter or harness. The muzzle is fitted over the dog's mouth and a strap fits around the back of the dog's head. Often there is a strap that fits around the dog's neck. This type of muzzle is effective, but it has to be quite tight in order to keep the dog's mouth shut. It can also be harmful to the dog, perhaps preventing it from panting on a hot day, or even chafing the tender sides of the dog's mouth. The muzzle is effective in stopping the dog from barking or opening its jaws. Very often, this type of muzzle is primarily used to stop a dog from biting or to calm people or other dogs that the muzzle-wearer might encounter.

There are problems associated with the barking of dogs, especially dogs being housed at a kennel. In such surroundings one barking dog will often start other dogs barking until there is uncontrollable noise emanating from the kennel. This can be a serious problem in urban areas, prompting complaints from neighbours of the kennel owners. Muzzles such as described above provide only a partially satisfactory answer to the problem of barking dogs, particularly since the dogs will quickly view the muzzle as a punishment and will try to avoid having a muzzle fitted to them. Other attempts at preventing barking are only partially satisfactory as well, including electronic devices attached to the dog's collar. They tend to chafe the dog's neck and destroy the animal's coat. They also do not always work and are very expensive.

There is a need for a device that is not uncomfortable to the dog, that is inexpensive to produce, and that will be effective in stopping a dog from barking.

SUMMARY OF THE INVENTION

The present invention meets the above requirements. It provides an elastic muzzle that is inexpensive to produce, that is easy to affix to a dog's head, that is not uncomfortable, that effectively stops the dog from barking, biting, or chewing, and which can be easily and quickly removed when necessary.

The anti-barking and anti-biting muzzle of this invention utilizes a pair of generally trapezoidal flaps of elastic material, connected together along the edges to form a frustoconical muzzle. Each of the flaps is preferably then stitched or seamed along its centerline to create four equally sized panels. An elongated strap is then stitched at each end thereof to the diametrically opposite edges of the straps. The muzzle can be easily slid onto the snout of a dog and the strap pulled over the ears and fixed at the back of the dog's head. The elastic flap portions apply an inwardly angled force against the dog's snout preventing the mouth from opening enough for the dog to bark or bite. However the dog can still open its mouth enough to pant if it desires. Should there be a need for the dog's human companion to remove the muzzle, as in a dangerous situation, the human can grab the strap and very quickly pull the muzzle from the dog's snout. On the other hand, the dog cannot remove the strap of its own accord. The elastic muzzle of this invention is not uncomfortable for the dog. Furthermore, the dog quickly learns to associate the muzzle with a human's desire for the dog to stop barking and soon even the sight of the muzzle will be sufficient to stop the dog from barking.

Broadly speaking, therefore the present invention can be considered as providing an anti-barking and anti-biting muzzle for animals comprising a muzzle portion adapted to fit over the snout of the animal and a strap portion adapted to fit over the head of the animal, and to be secured behind the head of the animal, the muzzle portion including at least four panel members of elastic material with adjacent panel members connected together along the adjacent edges thereof to create a generally frustoconical shape, the strap portion being connected at each end thereof to opposed seams of the muzzle portion.

DESCRIPTION OF THE PREFERRED EMBODIMENT

Figure 1:
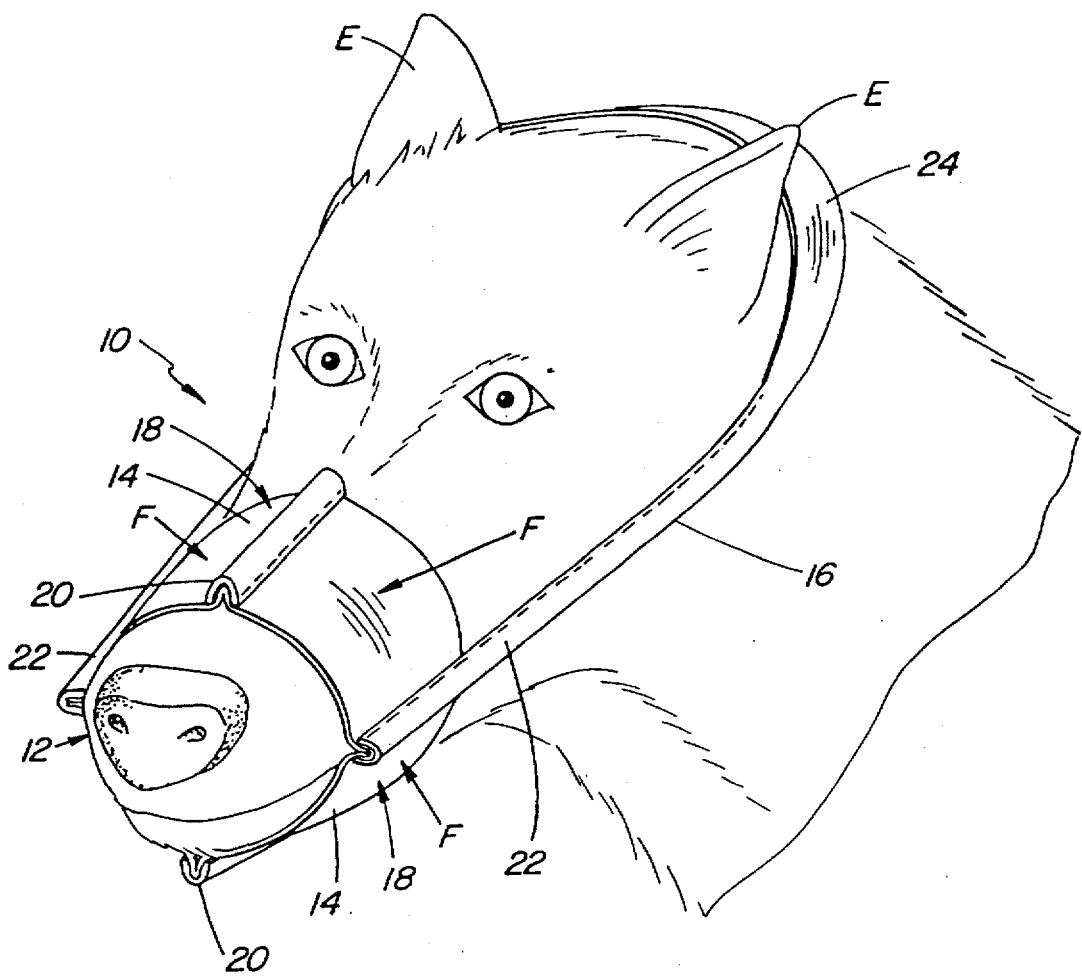
FIG. 1 is a perspective view of a dog's snout with the elastic muzzle of the invention thereon.
Figure 2:
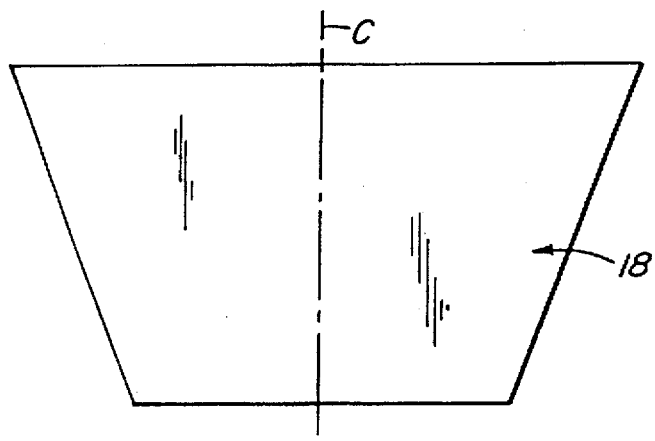
FIG. 2 is a plan view of an elastic flap used with this invention.

FIG. 1 shows a perspective view of the anti-barking muzzle 10 of this invention fitted to the snout 12 of a dog, such as a German Shepherd. It is seen that the muzzle 10 includes four panel members 14 and a strap member 16 that extends from the muzzle 10 and fits around the back of the dog's head, behind its ears, E. The panel members 14 are preferably created from two identical flaps 18 of an elastic material such as LYCRA™ or SPANDEX™, one of the flaps being seen in FIG. 2. Each flap 18 is generally trapezoidal in plan view, with typical dimensions of 5½ inches and 4 inches for the parallel edges and 3 inches for the converging edges. This will produce a muzzle for a medium to large sized dog. Smaller dimensions can be used to create a muzzle for a small dog.

Figure 4:
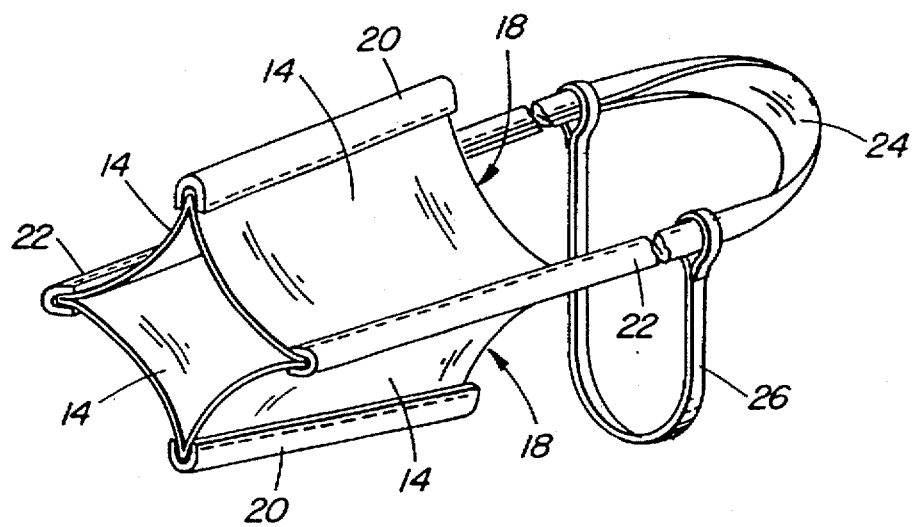
FIG. 4 is a perspective view of the elastic muzzle of this invention.

The two flaps are sewn together along the converging edges to create a generally frustoconical muzzle-shaped member. This member however is not particularly effective as an anti-barking muzzle. In order to provide the most effective anti-barking muzzle it is necessary to divide each of the flaps 18 in half, along the centerline C thereof which extends normal to the parallel edges of the flap. This is done by stitching a narrow band of non-elastic material 20 to a narrow doubled-over part of the flap, as best seen in FIG. 4. This provides the four panel members 14 of elastic material with diagonally opposite panel members being identical, and mirror images to the other diagonally opposite panel members.

Although the present invention has been particularly described as using four panel members 14 formed from two flaps 18, it has been found that the same results can be achieved with more than four panel members. The muzzle of the invention is effective with, for example, six or eight panel members formed about the periphery of the muzzle portion. However, fewer than four panel members reduces dramatically the effectiveness of the invention. Additionally, it should be understood that the panel members 14 could be individual panels, rather than part of larger flaps, and sewn together along adjacent edges to create the muzzle.

Figure 3:
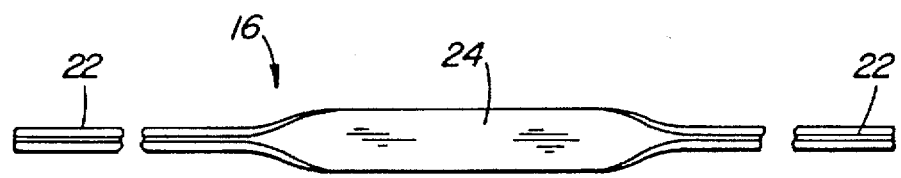
FIG. 3 is a plan view of the strap member used with this invention.

FIGS. 3 and 4 show the elongated strap 16 which is connected at each end to the stitched together edges of the flaps 18. The strap 16 is doubled over and stitched together over about a third of its length from each end, as at 22, leaving a wider central section 24. Typically the strap 16 will have an overall length of about 24 inches for a medium to large animal muzzle, with the central section 24 being about 8 inches long. The strap will be made from a heavy nylon, cotton or denim material. If desired, to accommodate different sized dogs, it would be possible to make the strap 16 adjustable in length in any known manner. For example the wider strap section 24 could be overlapped to shorten the length thereof and then clamped with a pin or a clamp to prevent it from loosening.

FIG. 4 shows the muzzle 10 as assembled and ready to be positioned on the head of a dog. The two divided flaps 18 are seen, as are the panel members 14 and the strap 16. Since the muzzle has a shape that is generally frustoconical or converging towards the front it will fit over the generally tapering snout of a dog and not be uncomfortable thereon. Should the dog try to open its jaws wide in order to bark, bite, or chew there will be a reactive force F as seen in FIG. 1 directed inwardly and angularly against the outer edges of the top and bottom jaws by the four elastic panel members 14. However, the dog can still open its jaws by a small amount to allow its tongue access to the air for panting if necessary. The strap 16 catches the back of the dog's skull, behind its ears, and cannot be removed by the dog, even if it tries rubbing the strap against a post or other object. Should the dog be especially clever and succeed in removing the strap 16 it would be possible to attach a removable chin strap 26 as seen in FIG. 4 as a further deterrent to removal.

In the event that the dog is accompanying a human and is wearing the muzzle, the human in attendance can still feel protected by the dog, since it is very easy for the human to grasp the strap and slip it over the dog's head so that the muzzle can be slipped from the dog's snout.

In summary, it is seen that the elastic anti-barking and anti-biting muzzle of this invention meets the design criteria set forth hereinabove in that it is inexpensive to produce, is not uncomfortable for the animal wearing it, is effective in preventing the animal from barking or biting, and is easily removed should the necessity arise. It has been found that dogs do not object strenuously to the muzzle of this invention being fitted to them and it has also been found that dogs quickly associate the muzzle with a human's desire for the dog to stop barking. If the dog does not want to wear the muzzle it realizes that its only option is to stop barking and usually it will stop.

The foregoing has described the essential features of the present invention. It is understood, however, that changes to the invention could be effected by a skilled person in the art and accordingly the protection to be afforded this invention is to be determined from the scope of the claims appended hereto.

We claim:

1. An anti-barking and anti-biting muzzle for animals including a muzzle portion adapted to fit over the snout of an animal and a strap portion adapted to fit over a head of an animal and to be secured behind a head of an animal, said muzzle portion comprising at least a pair of substantially equally sized generally trapezoidal flaps of elastic material having longer and shorter generally parallel edges and a pair of converging edges between said generally parallel edges, said flaps being sewn together along said converging edges, each flap having a central, longitudinally extending seam normal to said generally parallel edges so as to define four panel members of said elastic material, thereby creating a generally frustoconical shape, said strap portion being connected at each end thereof to diametrically opposed seams of said muzzle portion.

2. The muzzle of claim 1 wherein said muzzle portion is formed from four generally trapezoidal flaps of said elastic material having longer and shorter generally parallel edges and a pair of converging edges between said parallel edges, said flaps being sewn together along said converging edges so as to define said four panel members of elastic material.

3. The muzzle of claim 1 wherein said strap portion is formed from a length of narrow, non-elastic material having a central section and adjacent end sections, said central section being wider than said end section.

4. The muzzle of claim 3 wherein said end sections are formed by doubling over the strap material and sewing the doubled-over material together.

\* \* \* \* \*